(12) United States Patent
Jiang et al.

(10) Patent No.: US 10,713,332 B2
(45) Date of Patent: Jul. 14, 2020

(54) HARDWARE ACCELERATED LINEAR SYSTEM SOLVER

(71) Applicant: University of Dayton, Dayton, OH (US)

(72) Inventors: Zhenhua Jiang, Dayton, OH (US); Seyed Ataollah Raziei, Dayton, OH (US)

(73) Assignee: University of Dayton, Dayton, OH (US)

(*) Notice: Subject to any disclaimer, the term of this patent is extended or adjusted under 35 U.S.C. 154(b) by 12 days.

(21) Appl. No.: 16/017,049

(22) Filed: Jun. 25, 2018

(65) Prior Publication Data

US 2018/0373673 A1 Dec. 27, 2018

Related U.S. Application Data

(60) Provisional application No. 62/524,061, filed on Jun. 23, 2017.

(51) Int. Cl.
*G06F 17/12* (2006.01)
*G06F 9/38* (2018.01)
*G06F 17/16* (2006.01)

(52) U.S. Cl.
CPC ............ *G06F 17/12* (2013.01); *G06F 9/3885* (2013.01); *G06F 17/16* (2013.01)

(58) Field of Classification Search
CPC ....................................................... G06F 17/12
See application file for complete search history.

(56) References Cited

U.S. PATENT DOCUMENTS

| | | | | |
|---|---|---|---|---|
| 5,319,586 A | * | 6/1994 | Gupta | ..................... G06F 17/16 708/446 |
| 5,490,278 A | * | 2/1996 | Mochizuki | .............. G06F 17/12 708/446 |
| 5,717,621 A | * | 2/1998 | Gupta | ..................... G06F 17/12 708/446 |
| 2014/0297704 A1 | * | 10/2014 | Tang | ....................... G06F 17/12 708/205 |
| 2015/0205758 A1 | * | 7/2015 | Hasegawa | ............... G06F 17/12 708/446 |

* cited by examiner

*Primary Examiner* — Matthew D Sandifer
(74) *Attorney, Agent, or Firm* — Dinsmore & Shohl LLP

(57) ABSTRACT

Systems and methods for finding the solution to a system of linear equations include use of a reconfigurable hardware based real-time computational solver. The solver apparatus solves systems of linear equations by applying Gauss-Jordan Elimination to an augmented matrix in parallel on reconfigurable hardware consisting of parallel data processing modules, reusable memory blocks and flexible control logic units, which can greatly accelerate the solution procedure.

6 Claims, 16 Drawing Sheets k = Index of column being processed

| | k = index of column being processed | | | | | | | x = b |
|---|---|---|---|---|---|---|---|---|
| | A | | | | | | | |
| 1 | 0 | 0 | 0 | 0 | 0 | 0 | 0 | xi1 |
| 0 | 1 | 0 | 0 | 0 | 0 | 0 | 0 | xi2 |
| 0 | 0 | 1 | 0 | 0 | 0 | 0 | 0 | xi3 |
| 0 | 0 | 0 | 1 | 0 | 0 | 0 | 0 | xi4 |
| 0 | 0 | 0 | 0 | 1 | 0 | 0 | 0 | xi5 |
| ... | ... | ... | ... | ... | ... | ... | ... | ... |
| 0 | 0 | 0 | 0 | 0 | 0 | 1 | 0 | ... |
| 0 | 0 | 0 | 0 | 0 | 0 | 0 | 1 | xiN |

FIG. 2C

HARDWARE ACCELERATED LINEAR SYSTEM SOLVER

CROSS REFERENCES TO RELATED APPLICATIONS

This application claims the benefit of priority under 35 U.S.C. § 119(e) to U.S. Provisional Application Ser. No. 62/524,061, filed Jun. 23, 2017.

TECHNICAL FIELD

Embodiments of the present disclosure generally relate to a reconfigurable hardware based real-time computational solver for finding the solution to a system of linear equations.

BACKGROUND

Finding the solution to a set of simultaneous linear equations is generally required in numerous scientific and engineering problems. The linear solver, which achieves such a goal, can be commonly used in least square regression for sensor data, digital signal/video processing, model predictive control, and real-time circuit simulation. It can also find wide applications in mathematical computing such as finding the inverse of a matrix, computing determinants or ranks of matrices, etc.

A system of linear equations can be arranged into a matrix form, where each equation becomes a row in the matrix. While all variables can be placed into a column vector, x, the coefficients associated with the variables in all equations can constitute a matrix, A. An additional column vector, b, is added to the right hand side. A system of linear equations can be generally represented in the matrix format by $$\begin{bmatrix} a_{11} & a_{12} & a_{13} & \ldots & a_{1N} \\ a_{21} & a_{22} & a_{23} & \ldots & a_{2N} \\ a_{31} & a_{32} & a_{33} & \ldots & a_{3N} \\ \ldots & \ldots & \ldots & \ldots & \ldots \\ a_{N1} & a_{N2} & a_{N3} & \ldots & a_{NN} \end{bmatrix} \begin{bmatrix} x_1 \\ x_2 \\ x_3 \\ \ldots \\ x_N \end{bmatrix} = \begin{bmatrix} b_1 \\ b_2 \\ b_3 \\ \ldots \\ b_N \end{bmatrix}$$

In short, this can be described as Ax=b, where A is an N×N matrix, b is an N×1 vector, and x is an N×1 vector.

There exist two major methods to solve the linear systems: direct method and iterative method. Direct methods include LU factorization, QR factorization, Cholesky factorization, etc., which can be typically used for dense linear systems. Iterative methods may include Jacobi, Gauss-Seidel and relaxation iterations, which are suitable for sparse linear systems. This disclosure considers a direct linear solver and its real-time hardware implementation which aims to accelerate the solution procedure by use of parallelism. Also, efficient solution is essential to real-time applications, where all the calculations must be finished within the given time step.

In traditional direct methods, a popular approach is Gaussian elimination method. The Gaussian elimination procedure is to update the matrix continuously by applying a sequence of basic row operations to the lower portion of the matrix until the lower left-hand corner of the matrix becomes filled with zeros. Three types of basic row operations include swapping two rows, multiplying a row by a coefficient, and subtracting a multiple of one row from another row. Following a series of operations, a matrix can be transformed into an upper triangular matrix. A backward substitution process is then applied to find the solution in sequence based on the upper triangular matrix.

A further-reduced method, called Gauss-Jordan Elimination, is to eliminate one column in all rows except the pivot value or diagonal entry within each iteration loop, which can be set to 1 by normalizing each row. The resultant updated matrix after all elimination iterations will be a unit diagonal matrix, so the backward substitution is not needed. The solution will be the last column of the updated augmented matrix, i.e., the solution value in each row is the last value of that particular row vector. This method is not preferred in software solution because it involves more arithmetic operations than the Gaussian elimination method. But on parallel processing hardware the Gauss-Jordan method is more efficient because the hardware allows for parallel processing and elimination of all rows without increasing the processing time.

Field programmable gate arrays (FPGAs) are a type of modern integrated circuit (IC) devices consisting of a large number (e.g., millions) of reconfigurable logic units, as well as many programmable input/output blocks and interconnects. These FPGA devices allow the user to configure their operations through software codes that are written in hardware description languages (HDL) such as VHDL or Verilog. Nowadays, user-friendly, high-level programming tools, such as Xilinx System Generator, are available to be used to program these reconfigurable logic devices, which can help reduce the product development time and costs.

Since programmable logic arrays on FPGAs are massive parallel units, they naturally allow for parallel processing of a large amount of data. Clock signals generated from high-frequency oscillators enable data processing and operation with a clock cycle of as low as 5 ns. Another associated benefit is that FPGAS provide deterministic computation, which makes the timing control easy, especially in real-time implementation.

The present application discloses a hardware based implementation of a direct linear system solver based on FPGA. The disclosed solver directly solves systems of linear equations by applying the Gauss-Jordan Elimination method to an augmented matrix recursively. The hardware accelerator can exploit the inherent parallelism in the algorithm finding the solution, offering efficient implementation of the linear solver.

SUMMARY

Ongoing needs exist for a system and method for finding the solution to a system of linear equations by using a reconfigurable hardware based real-time computational solver. The solver apparatus solves systems of linear equations by applying Gauss-Jordan Elimination to an augmented matrix in parallel on reconfigurable hardware consisting of parallel data processing modules, reusable memory blocks and flexible control logic units, which can greatly accelerate the solution procedure.

Embodiments of the present disclosure are directed to computing systems which include a host computer system and a linear solver apparatus, in accordance with an embodiment of the present principles. The host computer system, which can be a DSP, CPU or other microprocessor systems, includes at least of a host memory, a host processor and an interface communicating with the accelerator hardware. The main components of the linear solver apparatus include an input data sampling block, a real-time computational solver to find the solution of a linear system of equations, and a solution update and data output block. The real-time computational solver performs the matrix updates in a recursive manner.

In at least one embodiment a further feature which may be included is the latency of this solver is reduced through parallel processing, pipelining and flexible use of memory blocks. For instance, the total latency of this linear solver is controlled below 1000 clock cycles for a dense system of dimension 32. On a Xilinx Vertex 6 FPGA of 200 MHz, which has a clock cycle of 5 ns, the minimum latency can be as low as 5 microseconds.

In embodiments of this disclosure, applications of this hardware accelerated linear solver include, but are not limited to, real-time least square estimation for sensors, digital signal/video processing and real-time circuit simulation. It can also find wide applications in mathematical computing such as finding the inverse of a matrix, computing determinants or ranks of matrices, etc.

An embodiment of the present disclosure provides an apparatus for finding the solution to a system of linear equations based on reconfigurable hardware to accelerate the solution procedure.

Another embodiment of the present disclosure provides a method for solving a system of linear equations in parallel on reconfigurable hardware in real time using the Gauss-Jordan Elimination method.

Another embodiment of the present disclosure provides a computer software code program that is designed to program and control the reconfigurable FPGA hardware to solve the system of linear equations according to the present method.

BRIEF DESCRIPTION OF THE DRAWINGS

FIG. 2A-C are illustrations of Gauss-Jordan elimination method application to solve a linear system of equations in matrix format.

DETAILED DESCRIPTION

Figure 1:
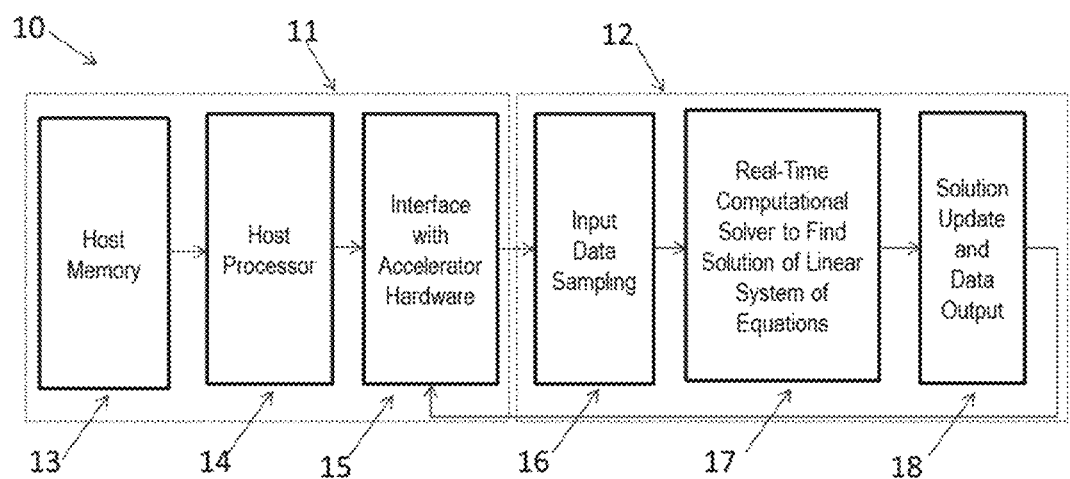
FIG. 1 is a schematic representation of a computing system including a host computer system and the present linear solver apparatus, in accordance with an embodiment of the present application.

FIG. 1 is a simplified schematic representation of a computing system 10 including a host computer system 11 and a linear solver apparatus 12, in accordance with an embodiment of the present application. The host computer system 11, which can be a DSP, CPU or other microprocessor systems, consists at least of a host memory 13, a host processor 14 and an interface 15 communicating with the accelerator hardware 12. Components of the linear solver apparatus 12 include an input data sampling block 16, a real-time computational solver 17 to find the solution of a linear system of equations, and a solution update and data output block 18. The real-time computational solver 17 performs the matrix updates in a recursive manner.

In the embodiment shown, the linear solver apparatus is realized on a reconfigurable integrated circuit called field programmable gate array (FPGA). The parameters for the linear solver are set up through the host computer system and the real-time data are communicated through the interface 15. The results or solution values are sent back to the host computer through the same interface 15.

Figure 2A:
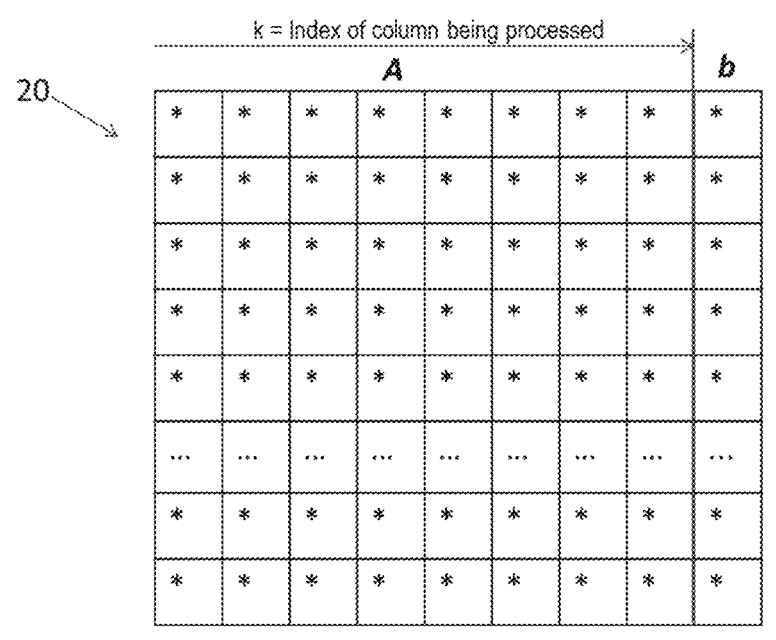
Figure 2B:
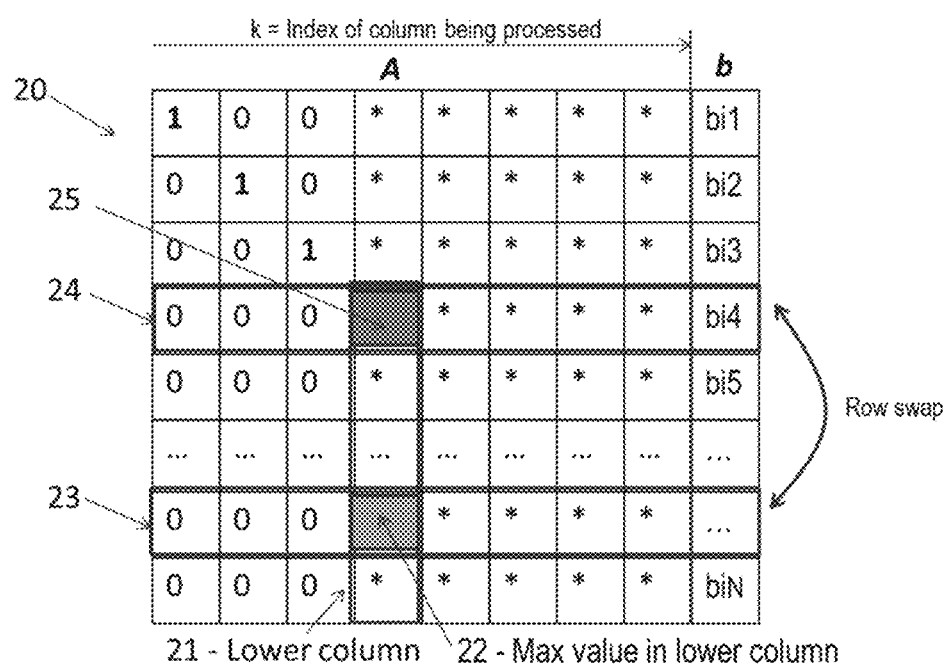

FIGS. 2A-C illustrate how the Gauss-Jordan Elimination method can be used to solve the linear system of equations. To facilitate the solution procedure and parallel processing on the hardware, a column-augmented matrix 20 is formed, i.e., [A|b], as illustrated in FIG. 2A. The row operations are based on the column-augmented matrix [A|b], where the number of column is the number of row plus one. Each row of the augmented matrix will be stored as a row vector in real-time implementation and updated in sequence, discussed later.

As demonstrated in FIG. 2B the main steps of recursive elimination in the Gauss-Jordan Elimination method include the following:

Pivot search: This step is to search the largest element at the current iteration in a lower column that is below the pivot element found and normalized at a previous iteration. As an example, at the $4^{th}$ iteration, the lower column 21 may include the elements below the entry associated with Row 3 (i.e., 1) in the $4^{th}$ column. Upon completion of the search process which can be done in parallel and with pipelining, the maximum value 22 is selected as the pivot element. The objective of pivoting is to make an element above and below the pivot element into a zero.

Row swap: This step is to exchange the row 23 with the previous kth row 24. The row with the maximum value becomes the new base row and the maximum value is placed in the pivot entry 25. This operation can be achieved by updating the index of the row vectors in the matrix, where the index is stored in a separate vector. The practical movement of data in the memory is not needed, thus the latency is greatly reduced.

Row update: This step is to update the left-hand side of the augmented matrix in all the rows with the goal that the pivot column will be replaced with one in the pivot entry and zeros at all other rows. This step involves a major part of arithmetic operations and can be done in parallel with efficient memory and arithmetic units.

Within each iteration loop, an unknown variable in the linear system of equations is eliminated. By the end of N iterations, the matrix A becomes a unit diagonal matrix, therefore the b vector becomes x, as shown in FIG. 2C.

Figure 3:
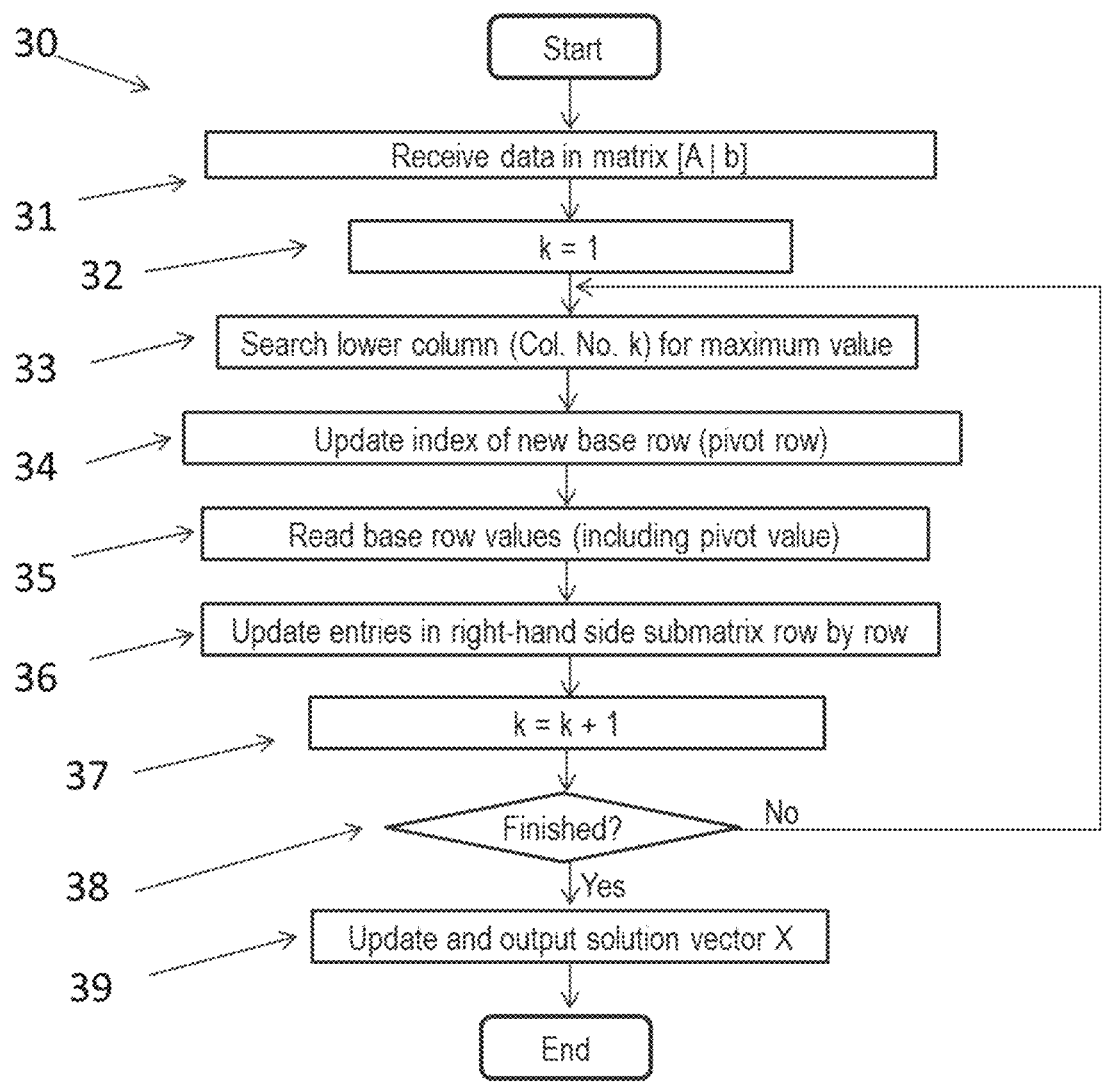
FIG. 3 illustrates the flow chart of Gauss-Jordan elimination algorithm in solving a linear system of equations.

FIG. 3 illustrates the flow chart of the Gauss-Jordan elimination algorithm in solving a linear system of equations. The first step 31 in the flow chart 30 is to receive the input data in the format of augmented matrix [A|b]. In the next step 32, the column number index is reset to 1, which means processing the first column is to be started. The following five steps constitute one iterative loop in the Gauss-Jordan elimination procedure. The next step 33 is to search the lower column (where the column number is k) for the maximum value. After the index of maximum value is found, the next step 34 is to update the index of the new base row (i.e., pivot row), followed by the step of reading base row values 35. In the next step 36, the main task it to update entries in right-hand side submatrix row by row. The rows are updated according to the following formula:

$$a_{ij}^{new} = a_{ij}^{old} - \frac{a_{ik}^{new} \cdot a_{kj}^{new}}{a_{kk}^{new}}$$

where k—index of base row, i—row index, j—column index, $a_{ij}^{old}=0$ and $a_{ik}^{new}=-1$ for the base row.

Following the matrix update, the column number index is increased by one in the step 37. Afterwards, a termination condition is checked to decide if the iterative loops have been finished 38. If k reaches N (or in other words, all columns have been processed), the elimination procedure is finished. Otherwise, the program flows back to Step 33. The final step 39 is to update and output solution vector X.

In accordance with the Gauss-Jordan Elimination method and algorithm, a piece of pseudocode is given:

```
for k = 1 ... N:
  Find the k-th pivot:
    i_max = argmax (i = k ... N, abs(A[i, k]))
    swap_rows(k, i_max)
  Do for all rows:
    for i = 1 ... N:
      g = A[i, k] / A[k, k]
      Do for all remaining elements in current row:
        for j = k + 1 ... N+1:
          A[i, j] = A[i, j] - A[k, j] * g
        End for
      Fill pivot entry with 1 and fill other rows with zeros:
      If i = k, then
        A[i, k] = 1
      Else
        A[i, k] = 0
      End if
    End for
End for
```

Figure 4:
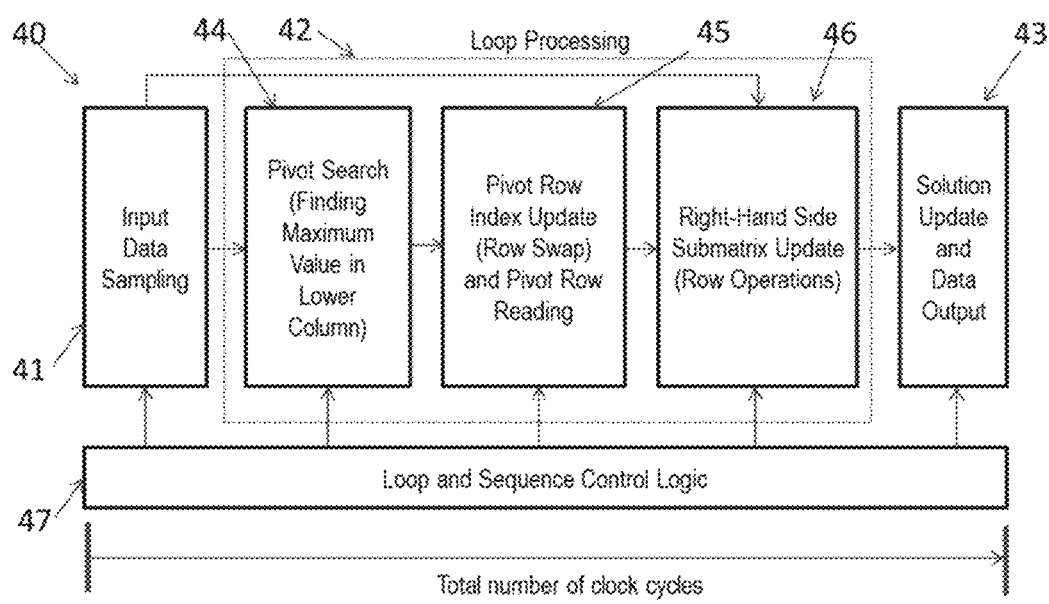
FIG. 4 is an illustration of the data flow in the present real-time computational solver running on reconfigurable hardware.

FIG. 4 is an illustration of the data flow in the present real-time computational solver running on reconfigurable hardware. The main data processing units on the linear solver apparatus 40 may include an input data sampling block 41, a "Pivot Search" block 44, a "Pivot Row Index Update and Pivot Row Reading" block 45, a "Submatrix Update" block 46, and a solution update and data output block 43. A "Loop and Sequence Control Logic" unit 47 is designed to generate control signals, including reset, enable and address signals, to manage the registers, switches, and memory blocks. The middle three blocks 44, 45, 46 are controlled to operate iteratively within loops 42. Each iterative loop is to process one column in the Gauss-Jordan elimination procedure. Parallelism is exploited in each of the five processing blocks.

In this preferred embodiment, the linear solver apparatus is realized on a reconfigurable integrated circuit called field programmable gate array (FPGA). The parameters for the linear solver are set up through the host computer system and the real-time data are communicated through the interface 15. The results or solution values are sent back to the host computer through the same interface 15.

Although FIG. 3 suggests a series data flow in the algorithm, the data flow at each step is proceeding in parallel and through pipelining in real-time implementation on parallel hardware, discussed below.

Figure 5:
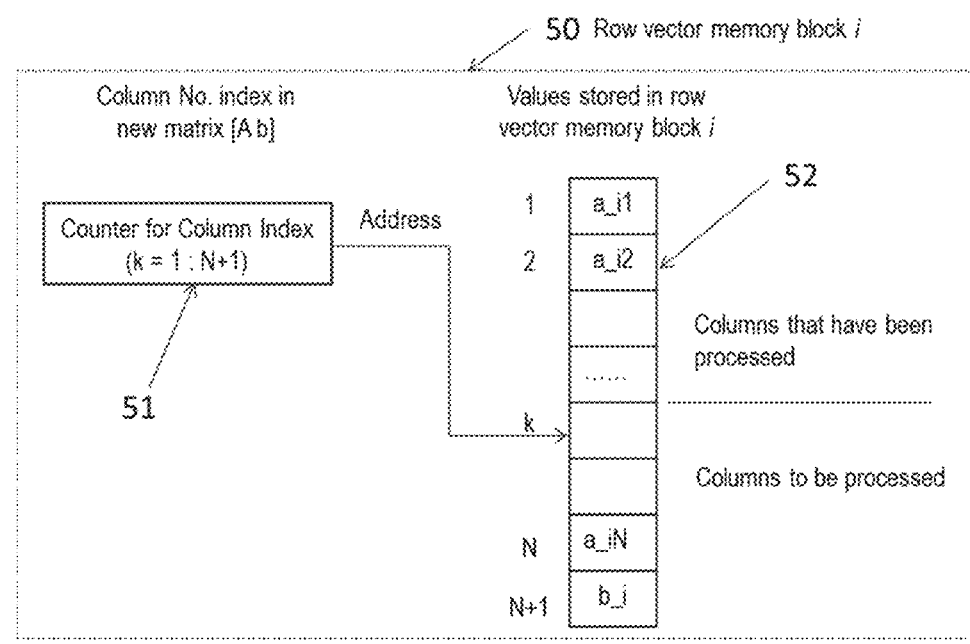
FIG. 5 illustrates the schematic diagram of memory management for input data in real-time implementation.

FIG. 5 illustrates the schematic diagram of memory management for input data in real-time implementation. A counter 51 is used to store the index of the value in a column. The value serves as the address to a memory block 52, which stores the values of a row vector.

The linear solver is constructed to handle the matrix operation row by row, which decouples the operation of different rows and allows parallel processing of multiple rows. Each row in the augmented matrix [A|b], represented by a vector 50, is stored in one individual BRAM memory 52. A counter 51 is used to generate the address that points to the location of the value stored in the memory block, which is also the column index of the value in the original row. The use of parallel memory modules, one for each row, allows for simultaneous access to all rows of the linear system as well as parallel execution of the Gauss-Jordan elimination procedure. To gain higher performance, a dual-port BRAM memory is chosen for each row or vector, because it supports two simultaneous reading actions from two ports or one reading action and one writing action within one clock cycle. The two ports are separately controlled so that the values may be updated as needed by writing to one of the ports while they can be read at any time. After they are being updated they will be written back in the same block. Data are read from output port B and written from input port A.

Figure 6A:
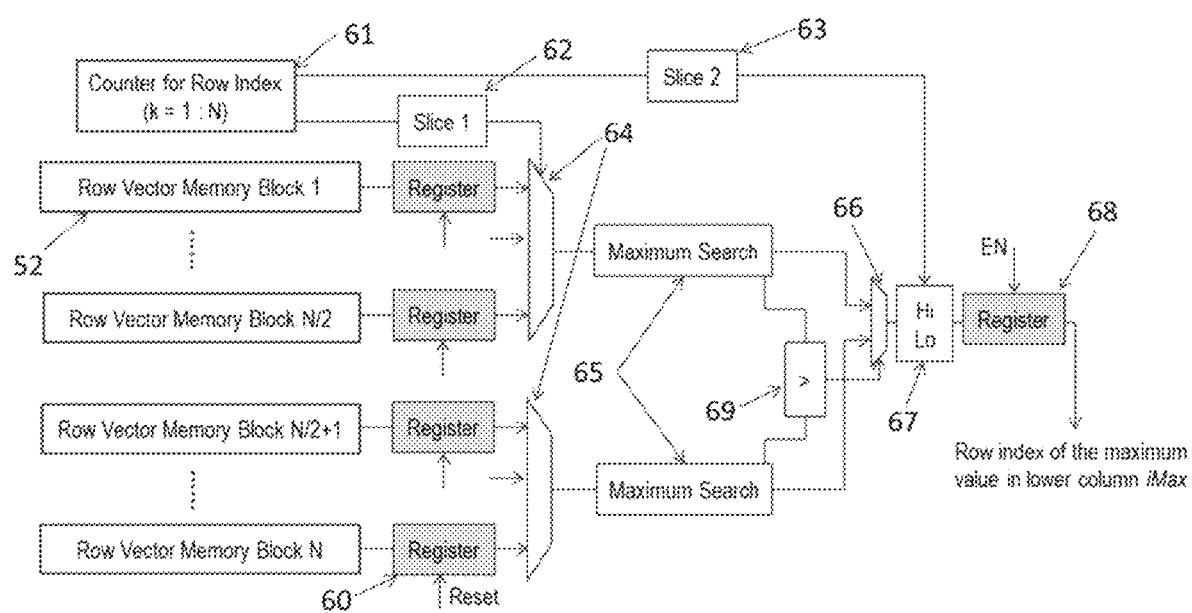
FIG. 6A-B illustrates a block diagram for finding the maximum element in a column in real-time implementation.
Figure 6B:
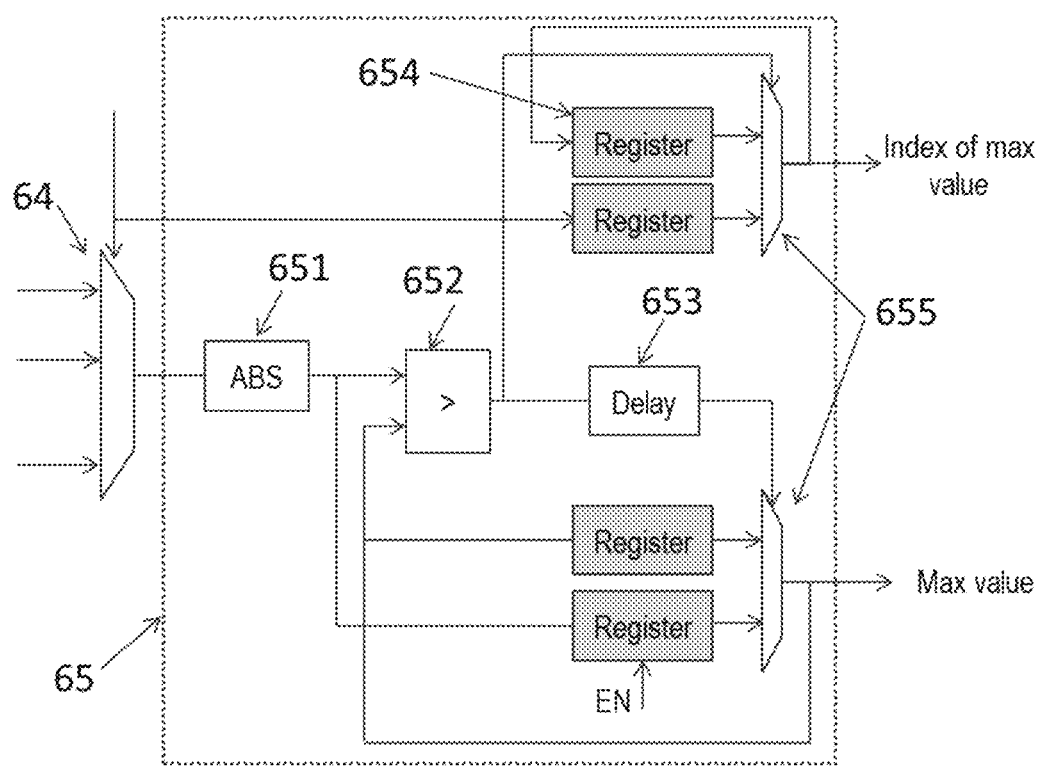

FIG. 6A-B illustrates the diagram of block for finding the maximum element in a column in real-time implementation. The search process is divided into 2 groups (as an example), and each group can processed individually and in parallel. After the subgroup search is done, the reduced-tree logic will be used to decide the index of the maximum from the 2 groups. Depending on the need of parallel processing, the search process can be divided into 4 or 8 groups.

In the preferred embodiment as shown in FIG. 6A, an N/2-port switch 64 is used to select a series of data. The data are read from memory block 52 and stored in registers 60. A counter 61 is used to generate the address for the switch 64 to sequentially select the values from the memory blocks 52. A slice block 62, which picks up the lower log 2(N)−1 bits of the index value (in binary format), is used to generate the address for one of the switches 64. The selected data series is sent to a maximum search block 65 to select the maximum value and the index of the maximum value. A 2-port switch 66 is used to select the index of the final maximum value from the parallel blocks 65. A comparator 69 is used to control the switch 66. The index value (in binary format) from the maximum search block 65 will be combined with the output from another slice block 63, which picks up the highest bit of the index value (in binary format), through block 67. The combined value will be the final index of the maximum value in the entire search process and be stored in register 68.

When the total number of values for comparison is higher than N/2, all the values are compared with each other. However, when the total number is less than N/2, a variable timing mechanism is used, which will be explained later in FIG. 11. Once the value in one row is selected as the maximum and finished, the register 69 is reset to zero for that particular row and will be skipped, to avoid duplicate comparison.

The search process is performed sequentially. The series of data selected from the memory blocks are sent to a maximum search block 65. Pipelining is used to increase the throughput. The maximum search block 65 is illustrated in FIG. 6B. After a series of data is selected and passed through the switch 64, the absolute value is found in block 651. These absolute values are then compared with each other through a comparator 652. A delay block 653 of one clock cycle is used to synchronize with data in other registers 654. Two switches 655 are used to select the larger value and the index of the larger value, respectively, in each round of comparison. The outputs from the maximum search block include the maximum in the series and the index of the maximum value.

Figure 7A:
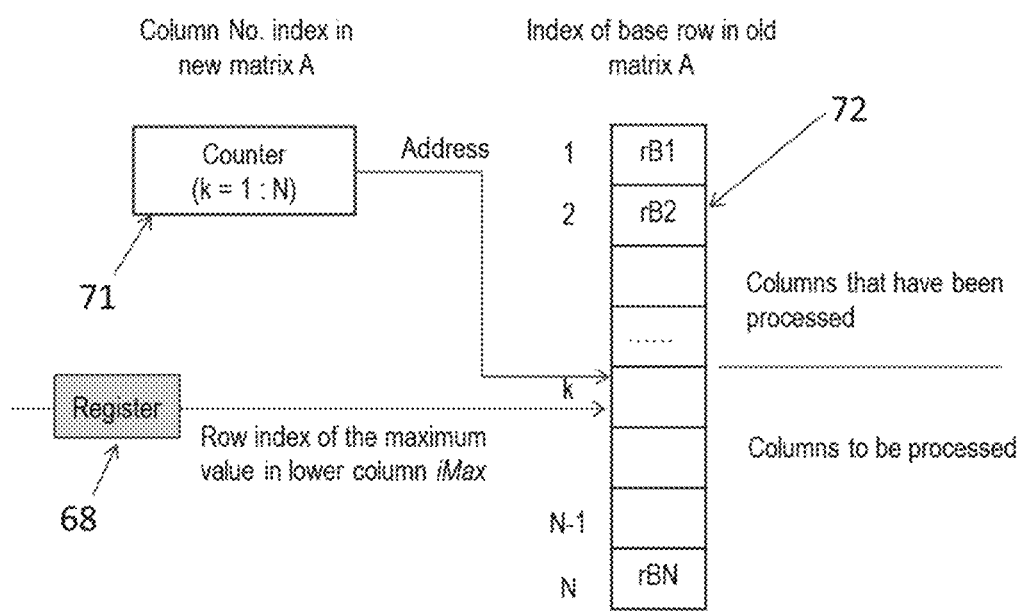
FIG. 7A-B illustrates a diagram for updating the base row index and reading base row.
Figure 7B:
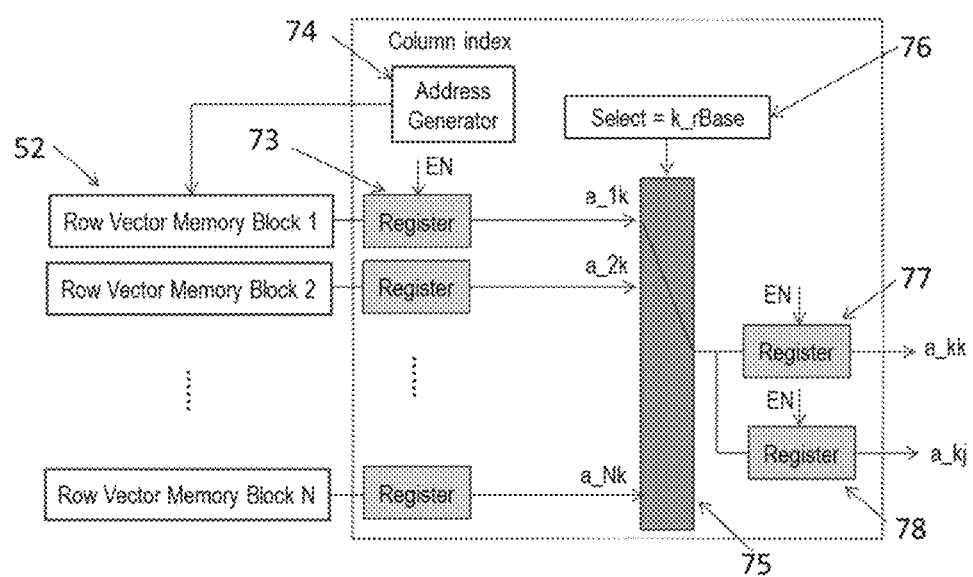

FIG. 7A-B illustrates the diagram for updating the base row index and reading base row. As shown in FIG. 7A, a dedicated memory block 72 is used to store the index of the respective base rows in each iterative loop of the elimination procedure. During the operation of row exchange, updating the index of the base row vectors can logically change the rows, instead of physically moving the data from one memory block to another. This mechanism greatly reduces the latency. A counter 71 is used to generate the address to which the value of is stored in the memory block 52. The value of the row index of the maximum value in the lower column, iMax, is sampled by the register 68 before being written to the memory block 72. As shown in FIG. 7-b, when reading the values from the base row, the memory block 52 corresponding to the base row index is selected and the data values are read. The values are sent to the register 73 and sampled at a proper clock instant. An N-port switch 75 is used to select the elements from the base row. The N registers 73 are connected to the input ports of the N-port switch 75. The address 76 for the switch 75 is the index of the value stored in the memory block 72. The same set of switch will be used later. This is possible because the input ports of the switch are connected to the N memory blocks through externally-controlled registers 73. An address generator 74 is used to generate the column index to pick up the appropriate values in the memory block 52. When enabled, the address is incremented by one to select the remaining the elements in the row after the pivot element. Two registers (77 and 78) are connected to the output of the N-port switch. The register 77 is used to sample and store the pivot element. The register 78 is used to sample and store the values of the remaining elements. Since this value will be sent to the following Gauss-Jordan Elimination block 80 for processing in a sequence, the value is also sampled sequentially.

Figure 8:
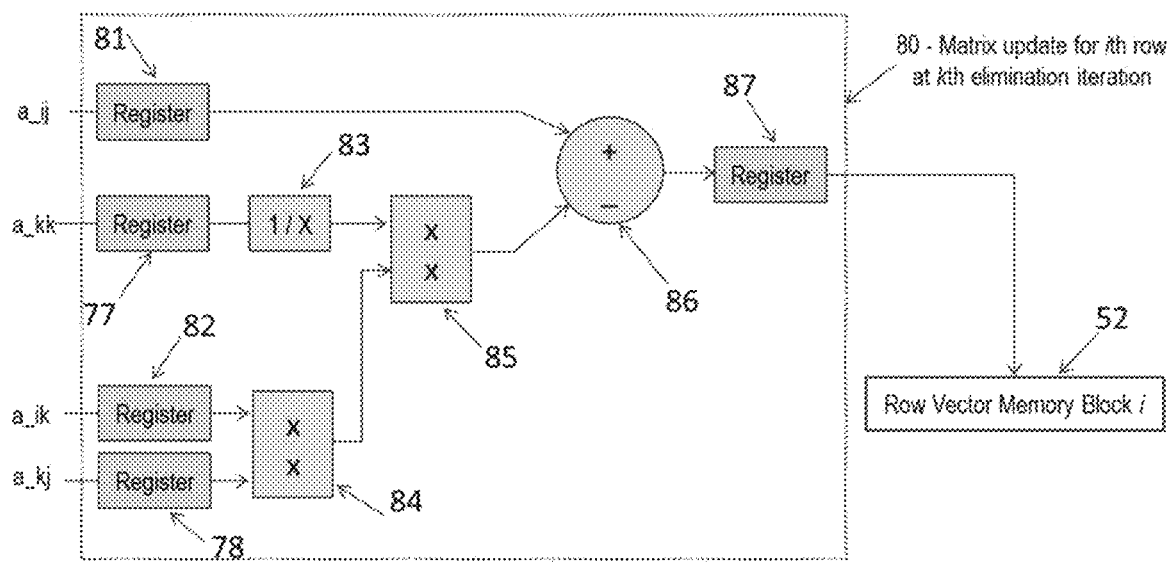
FIG. 8 illustrates a diagram of a Gauss-Jordan elimination block in real-time implementation.

FIG. 8 illustrates the diagram of a Gauss-Jordan elimination block in real-time implementation. Pipelining is applied to perform the arithmetic in a sequence. The registers and memory modules are controlled through the Enable signals so that the following arithmetic can be performed.

$$a_{ij}^{new} = a_{ij}^{old} - \frac{a_{ik}^{new} \cdot a_{kj}^{new}}{a_{kk}^{new}}$$

In each row operation, four registers (77, 78, 81 and 82) are used to store the operands. The register 81 and the register 82 are sequentially sampled so that a vector of values is sent to the multiplier from each register. The output of the multiplier 84 is sent to the second multiplier 85. Another input to the multiplier 85 is the output from the reciprocal 83, which is connected to the register 77. The output from register 77 is the sampled value of the pivot element. The value sampled by the register 81 is connected to the first input of the subtract unit 86, while the output from the multiplier 85 is connected to the second input. The output from the subtract unit 86 is sent to a register 87 and then written back to the memory block 52.

Figure 9:
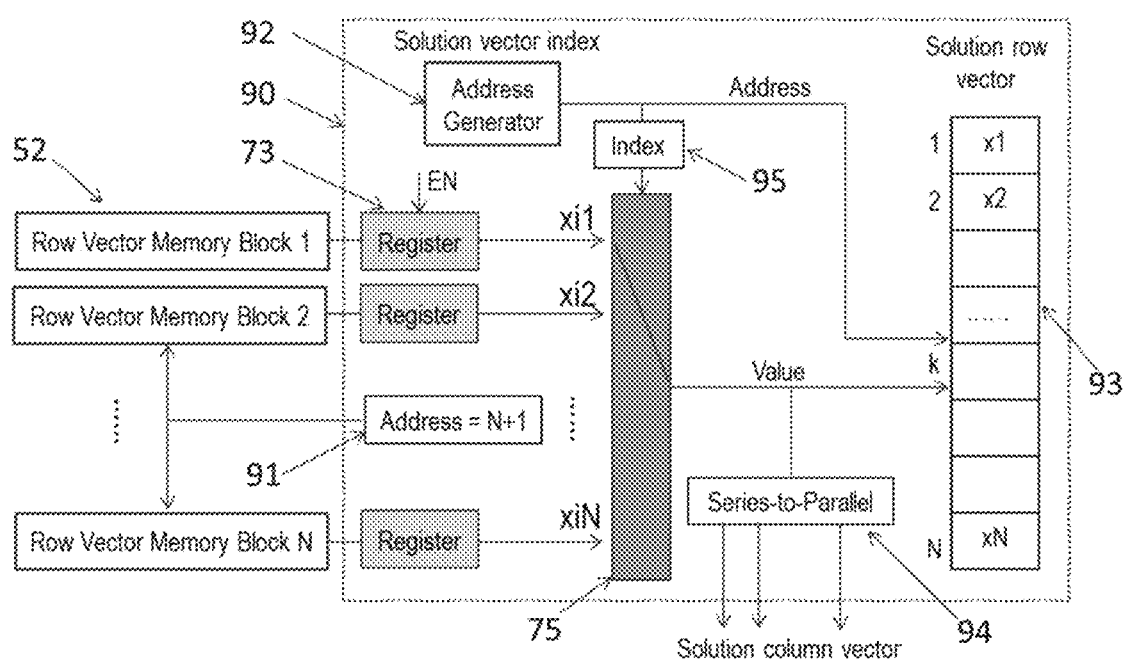
FIG. 9 illustrates the schematic diagram of memory management for output data in real-time implementation.

FIG. 9 illustrates the schematic diagram 90 of memory management for output data in real-time implementation. There are two types of output formats—parallel data output and series data output. A series-to-parallel block 94 is used to generate the parallel output data. A switch is used to select the data from the memory blocks and write into the solution vector memory block 93 in series. An index block 92 sends the column index to the solution vector memory block 93 for addressing.

The same switch 75 used for row vector reading is reused here to reduce resource consumption. The memory block 52 corresponding to the base row index is selected and the data values are read. The values are sent to the register 73 and sampled at a proper clock instant. The N-port switch 75 is used to select the elements from the corresponding row. The N registers 73 are connected to the input ports of the N-port switch 75. The address 95 for the switch 75 is the index of the value written to the solution memory block. An address generator 91, which has a value of N+1, meaning the last value in the row vector, is used to generate the column index to pick up the appropriate values in the memory block 52.

Figure 10:
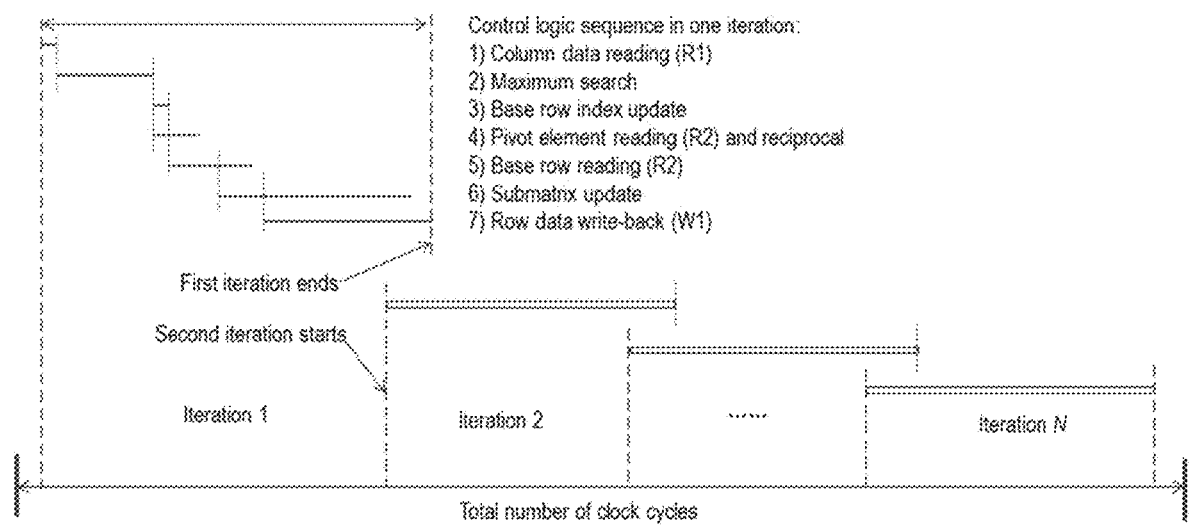
FIG. 10 illustrates a timing diagram (including parallelism and pipelining) for the loop and sequence control logic in real-time implementation.

The control logic unit synchronizes all the processes by generating the required sequence of control signals for the loop and parallel processing units to execute the instruction in turn. FIG. 10 illustrates the timing diagram (including parallelism and pipelining) for the loop and sequence control logic in real-time implementation. Before the iterative process is started, input data are sampled. After the iterative process is finished, the solution values are output. The control logic sequence within one iteration loop includes:
1) Column data reading (R1)
2) Maximum search
3) Base row index update
4) Pivot element reading (R2) and reciprocal
5) Base row reading (R2)
6) Submatrix update
7) Row data write-back (W1)

Some of these steps can be performed in parallel and through pipelining. Since each row in the matrix is processed, the processing is done in parallel through separate memory blocks, DSP blocks, and control logic. When the first data value in the base row is read and processed (step 5), the submatrix update (step 6) can be started. In the first iteration, whenever the first data value update in each row is finished (step 6) and written back to the memory block (step 7), the second iteration is started (step 1 in the next iteration).

Figure 11:
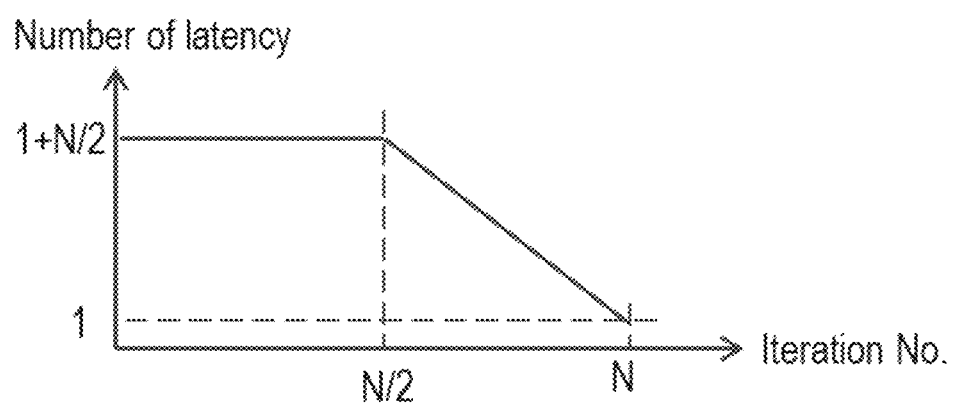
FIG. 11 illustrates the variable latency mechanism.

FIG. 11 illustrates the variable latency mechanism in the maximum search block 65. During the first N/2 iterations, all the numbers are sent to the parallel Search units 65. The total latency of the search process is constant, 1+N/2, where the latency of one clock cycle is due to the operation of finds the absolute value. During the second N/2 iterations, the number of values to be compared is less than N/2. Only the values to be compared are sent to the Search unit. The control logic is managed to scan and compare only a necessary number of elements. Therefore the total latency is varying with the number of elements for comparison, thus the iteration number.

Figure 12:
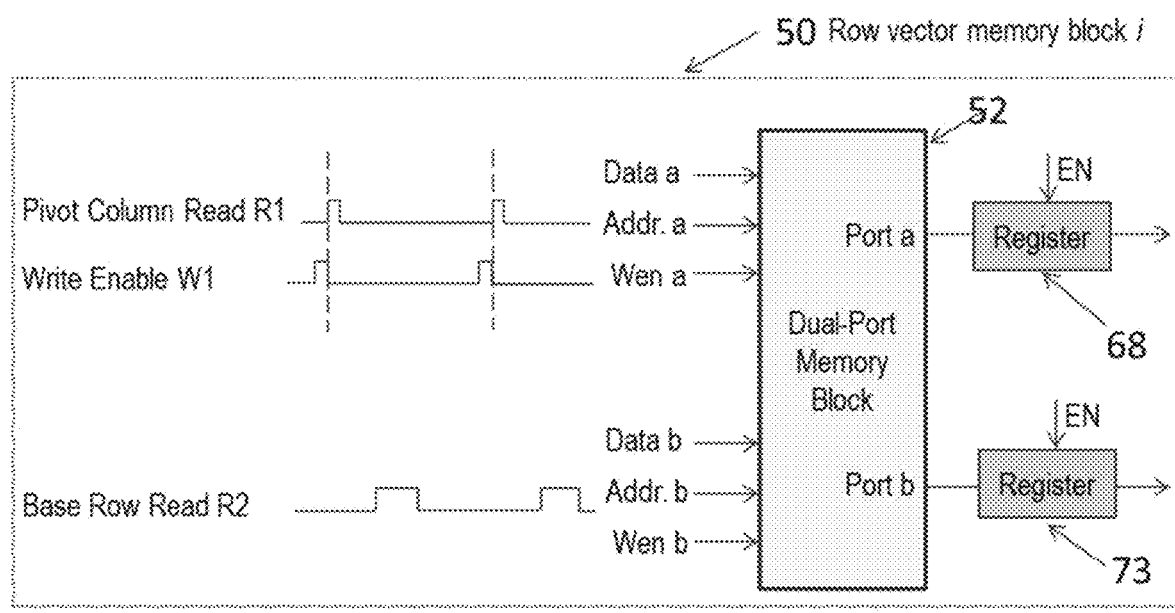
FIG. 12 illustrates the timing for memory management

FIG. 12 illustrates the timing for memory management. There are two reading actions and one writing action on each row vector memory block during each iterative loop. The first reading action (R1) is to read one data value out in each row and deliver it to the maximum search unit. The Enable pulse duration is only one clock cycle. The second reading action (R2) is to read all data values out in each row and deliver them to the submatrix update unit. The Enable pulse duration is related to the number of columns, (N−k+1). The writing action (W1) happens when the first element update is finished. The Enable pulse duration is related to the number of columns, (N−k+1). The first reading action for the next iterative loop will follow the end of the writing action.

The present method and apparatus can scale up to a larger system of linear equations by appropriate modifying the memory blocks, computing units and control logic. The resource consumption is limited by reusing the memory blocks and DSP units. When the linear solver is scaled up, additional resources are needed for the larger matrix.

Applications of the hardware accelerated linear solver include, but are not limited to, real-time least square estimation, digital signal/video processing, quadratic programming, and real-time predictive control. Appropriate adaption can also be made to accelerate real-time electromagnetic transient simulation of linear, nonlinear, or switching power conversion systems that find applications in a wide range of industry sectors.

What is claimed is:

1. An system for solving a system of linear equations, the system comprising:
   a host computer;
   a linear solver apparatus in communication with the host computer, the linear solver apparatus comprising an input data sampling block, a real-time computational solver, and a solution update and data output block, and configured to implement parallel processing hardware, pipelining, and reusable memory blocks;
   wherein the linear solver apparatus applies a Gauss-Jordan Elimination method on the system of linear equations.

2. The system of claim 1, wherein the linear solver apparatus comprises a reconfigurable field programmable gate array (FPGA).

3. The system of claim 2 further comprising computer software program configured to control the reconfigurable FPGA to solve the system of linear equations.

4. A method for solving a system of linear equations in parallel, the method comprising: providing the system of linear equations to a system according to claim 1; and applying the Gauss-Jordan Elimination method on the system of linear equations by the linear solver apparatus.

5. The method of claim 4, wherein the Gauss-Jordan elimination method is applied in real time by the linear solver apparatus, wherein the linear solver apparatus comprises a reconfigurable field programmable gate array (FPGA).

6. The method of claim 5, wherein the reconfigurable FPGA is controlled by a computer software program to solve the system of linear equations.

* * * * *